United States Patent [19]

Schuierer

[11] 4,207,072

[45] Jun. 10, 1980

[54] PROCESSES FOR REMOVING IMPURITIES FROM TEXTILE MATERIALS

[75] Inventor: Manfred Schuierer, Zell, Fed. Rep. of Germany

[73] Assignee: Bruckner Apparatebau GmbH, Erbach, Fed. Rep. of Germany

[21] Appl. No.: 551,743

[22] Filed: Feb. 21, 1975

[30] Foreign Application Priority Data

Feb. 28, 1974 [DE] Fed. Rep. of Germany ....... 2409488

[51] Int. Cl.² ............................................... B08B 3/08
[52] U.S. Cl. ........................................... 8/137; 8/138; 8/142
[58] Field of Search ................ 8/137, 137.5, 138, 141, 8/142

[56] References Cited

U.S. PATENT DOCUMENTS

| | | | |
|---|---|---|---|
| 2,052,891 | 9/1936 | Merrill | 8/137 |
| 2,056,141 | 9/1936 | Myers | 8/137 |
| 3,404,943 | 10/1968 | Morris | 8/142 |
| 3,458,273 | 7/1969 | Case | 8/137 |
| 3,476,504 | 11/1969 | Case | 8/138 |
| 3,619,116 | 11/1971 | Saville | 8/142 |
| 3,630,661 | 12/1971 | Ramier | 8/137 |
| 3,635,656 | 1/1972 | Piepmeyer | 8/142 |
| 3,663,160 | 5/1972 | Stone | 8/137 |
| 3,679,590 | 7/1972 | Cormany | 8/142 |

*Primary Examiner*—Paul R. Michl
*Attorney, Agent, or Firm*—Learman & McCulloch

[57] ABSTRACT

Water or organic solvent soluble impurities are removed from textile materials at a treatment zone by applying to the material a first liquid capable of dissolving the impurities, following which a second liquid immiscible with the first liquid is applied to the material to expel the first liquid and the dissolved impurities. The two liquids are then separated and the material is removed from the treatment zone and dried without further contact with the first liquid.

17 Claims, 3 Drawing Figures

PROCESSES FOR REMOVING IMPURITIES FROM TEXTILE MATERIALS

The invention relates to a process for removing impurities and contaminants from textile material by applying to the material a liquid in which the impurities and contaminants are soluble.

The removal of impurities and the like from textile material has hitherto generally been effected by applying to the material in a relatively large amount a liquid in which the impurities are soluble whereby the washing liquid is diluted until the residual contamination still present has been reduced to an acceptable value. For this purpose, the textile material is frequently passed through counterflow apparatus in the individual zones of which the textile material continuously comes into contact with a less soiled fraction of the solvent used.

A disadvantage with this usual method is the large amount of liquid necessary for the washing process. When using aqueous washing liquors the large amount of liquid presents serious problems particularly with regard to the waste water regulations which must be observed. If on the other hand (for example for removing fatty contaminants) organic solvents are used great disadvantages are involved if it is necessary to operate with dilute washing liquors because of the high costs of these solvents and the costs of the necessary recovery.

To remove from textile material firstly water-soluble and secondly water-insoluble impurities and contaminants it is also known in a combined process to treat the textile material firstly with an organic solvent and subsequently with hot water. However, with this process as well the water-soluble impurities are washed out in a dilute aqueous liquor.

The invention has for its objective, the developing of a process which avoids the aforementioned defects and which permits the impurities contained in the textile material to be removed with a washing liquor as concentrated as possible.

According to the invention this objective is achieved in that the liquid which is applied to the textile material and in which the impurities are soluble is expelled or displaced from the textile material with the impurities dissolved in the liquid by a second liquid which is immiscible with the first liquid and the two liquids then separated.

Thus, the process according to the invention deliberately dispenses with the hitherto usual procedure of washing with increasing dilution of the washing liquor. On the contrary, by means of the first liquid (the solution liquid) a solution is prepared which is as concentrated as possible and contains the impurities and which is then forced out of the textile material by a second liquid immiscible therewith. In this manner by far the greater portion of the impurities and contaminants are removed from the textile material and are present in a very concentrated liquor. After the separation of the two immiscible liquids no great difficulties are then involved in suitably treating the first liquid with the impurities dissolved therein so that such liquid can either be recovered or discarded.

Conveniently, the first liquid is applied to the textile material only in an amount necessary to dissolve the contaminants. In this manner the amount of the second liquid required to expel the first liquid is reduced in desirable manner.

If water-soluble contaminants and the like are to be removed from the textile material, the first liquid is conveniently water and the second liquid an organic solvent.

If on the other hand water-insoluble contaminants are to be expelled from the textile material the first liquid is an organic solvent and the second liquid water.

It is important that the textile material be led through a zone in which the two liquids are to be separated in such manner that the textile material after expulsion of the first liquid does not come into contact therewith again.

Particularly advantageous with the process according to the invention is that it is not necessary to employ emulsifiers in the aqueous liquid. The use of such substances may at the most be expedient in the latter part of the washing operation for removing residual amounts of impurities.

To improve the solubility of the contaminants and impurities during the action of the first liquid (i.e. the solution liquid) the textile material and/or the liquid may be heated.

The expulsion of the first liquid from the textile material by the second liquid which is not miscible with the first liquid may if necessary be further promoted by addition of certain chemicals.

The subsequent separation of the two liquids is done either purely mechanically, i.e., gravitationally in particular utilizing their different specific weight, or by distillation.

Some examples of apparatus for carrying out the process according to the invention are illustrated in the drawings, wherein.

Figure 1:
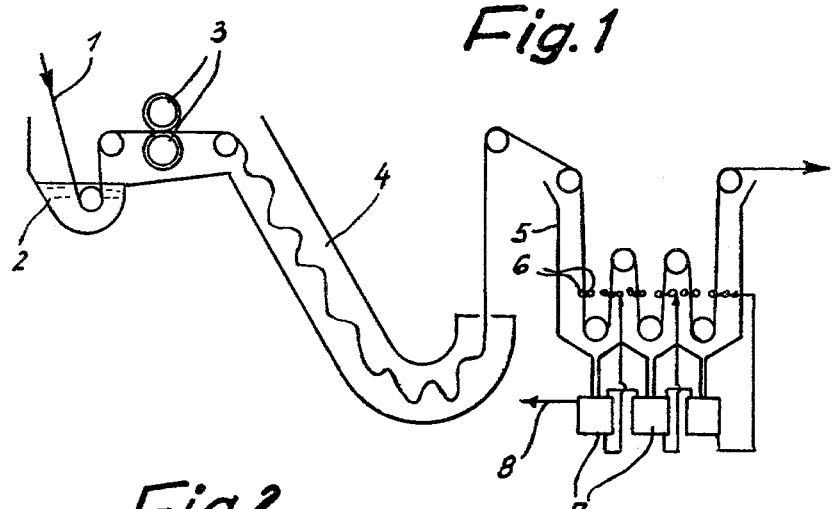
FIG. 1 is a schematic drawing of one embodiment.

The apparatus according to FIG. 1 is used for desizing grey cloth containing size. The cloth 1 passes first through a trough 2 containing water and desizing agent. A large part of the entrained water is then squeezed out by a squeezing assembly 3. The cloth then passes via a residence section 4 to a container 5 in which an organic solvent is sprayed onto the water-containing cloth through nozzles 6. This expels the water and the size dissolved therein from the cloth 1. The washing liquor passes to a distillation apparatus 7 from which the organic solvent is returned to the jets 6 whilst the lighter phase (containing the water and the size dissolved out of the cloth) is extracted at 8 and possibly subjected to a concentration. The cloth 1 is supplied after leaving the container 5 to a solvent dryer in which the solvent residues are removed.

Figure 2:
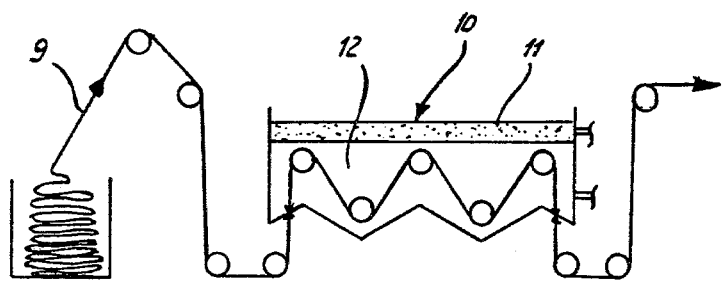
FIG. 2 is a schematic drawing of a second embodiment.

In the embodiment of FIG. 2, wet polyester material 9, supplied for example from a jet machine, is fed to a container 10 filled in its lower portion with organic solvent. The water contained in the material 9 is expelled therefrom together with the water-soluble contaminants and rises to form an upper layer 11 because it has a specific gravity less than that of the organic solvent. This upper layer 11 is withdrawn from the container 10 in such manner that the material fed through the solvent bath 12 does not again come into contact with the layer 11 containing the contaminants.

Figure 3:
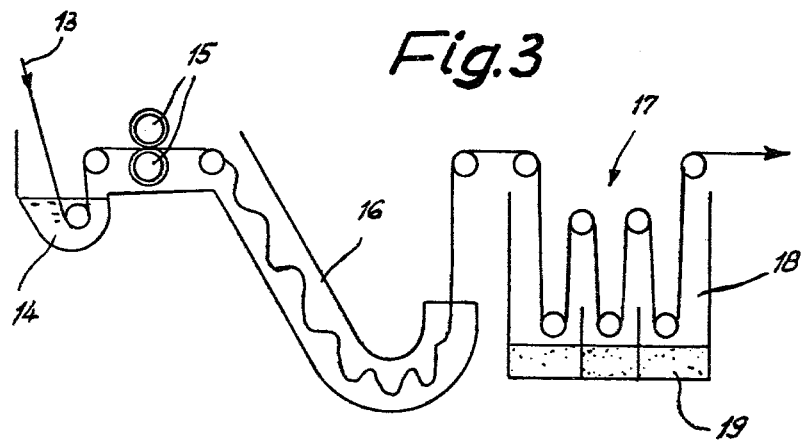
FIG. 3 is a schematic drawing of a third embodiment.

FIG. 3 shows an apparatus for degreasing fat-soiled material 13. The latter passes firstly through a trough filled with solvent 14, is then squeezed by a squeezer roll pair 15 and subsequently passes via a residence section 16 to a container 17 which is filled in the upper portion 18 with water whereas in the lower portion 19 the solvent contained in the material separates together with the fatty impurities. The organic solvent is fed to a distillation apparatus, not illustrated, whilst the material is freed in a dryer from the water contained therein (which in this case is the expelling liquid).

The wide variety of applications of the invention will be illustrated by the following:

1. The process according to the invention may advantageously be used for removing water-soluble sizing agent from woven cloth prior to the dyeing.

The warp threads of woven material must of course be provided with size so that they run freely during weaving and warp thread breakages are avoided. The sizing agents usually employed are natural polymers, such as starch or synthetic polymers, such as polyvinyl alcohol, polyacrylonitrile, carboxymethyl cellulose derivatives. These water-soluble sizing agents must then be washed out of the material prior to dyeing to ensure good absorption of the dye. In view of the high cost of the sizing agents recovery and reuse thereof are very desirable.

However, in the known washing out of size-containing material in aqueous liquor the sizing agents are present in highly diluted form and the removal of the liquid phase by distillation thus requires a high expenditure of energy. Another disadvantage is that the sizing agents are present together with the greasy impurities simultaneously removed from the material and consequently a further treatment operation is necessary for recovering the sizing agents.

According to the invention these problems are solved in simple manner in that firstly 50 to 250 percent by weight of water is applied to the size-containing material, the material is then allowed to rest for several minutes, the material is then rinsed with an organic solvent, preferably perchloroethylene, and after separation of the two liquids the aqueous phase containing the sizing agents—possibly after further concentration—are used again for sizing. With this procedure not only are the water-soluble sizing agents recovered with low energy expenditure but at the same time it is ensured that the troublesome greasy contaminants pass directly into the organic agent when the aqueous phase is expelled from the material.

2. A further example of the use of the process according to the invention relates to the after-treatment of imprinted textile webs.

For the imprinting of textile webs usually the dye is dissolved with the chemicals and worked with the aid of a thickening agent to form a printing paste because the desired sharpness of the contour of the print can be achieved only with this viscous form. After the imprinting a drying operation and a subsequent steaming operation are carried out, the dye migrating from the thickening agent to the textile material. After the steaming the material is washed, it being necessary to remove the unfixed dye in addition to the thickening agents. With conventional washing out in the aqueous phase thickening agents lead to great pollution of the waste water.

On the other hand, for various reasons it is not practicable to replace the conventional water-soluble thickening agents by thickening agents soluble in organic solvents, for firstly great difficulties are involved in using volatile solvents in a printing machine and secondly hydrophobic polymers do not have the properties required in the steam fixing of the dye.

These difficulties are now obviated according to the invention by the following after-treatment of imprinted textile webs, the water-soluble thickening agents of the printing paste and unfixed dye being removed: Water and possibly a detergent are applied to the imprinted and steamed web of textile material, the material left for a few minutes, preferably preventing smearing of dye and imprinted parts of the web by inserting a foil, and the aqueous phase then expelled from the material web with an organic solvent; after separation of the liquid mixture the organic solvent is recovered whilst the aqueous phase is concentrated by evaporation and discarded.

3. A further example of use of the process according to the invention relates to the after-treatment of dyed textile material, in particular textile piece goods, which have been discontinuously dyed with dispersion dyes.

Firstly, part of the aqueous phase is removed mechanically from the dyed textile material (for example in a jet dye machine or on a beam), for example by centrifuging or suction. Thereafter the part of the aqueous phase remaining in the goods is expelled by an organic solvent. If dispersion dyes which are very soluble in organic solvents were used for dyeing the material, the expulsion operation, apart from the removal of the contaminated water, also results in a separation of the unfixed dye and thus substantially improves the fastness of the dyeing.

4. If particularly intensive soiling and contamination is to be removed from textile material and the contaminants are of a non-oily nature, according to the process of the invention this may advantageously be done in that firstly water and a detergent are applied to the textile material, the textile material then left for at least a few minutes and thereafter the aqueous phase expelled by an organic solvent from the material. In this manner, a particularly high degree of cleaning is achieved.

5. It is also pointed out generally that the process according to the invention is particularly suitable for textile material comprising synthetic fibres, in particular for textiles from polyester, polyamide, polyacrylonitrile and acetate as well as mixtures of these fibres.

What is claimed is:

1. A process of removing impurities from textile material comprising first applying to said material a first liquid in which the impurities are soluble; subsequently expelling said first liquid and impurities dissolved therein from said material by applying to said material a second liquid immiscible with the first and having a specific gravity different from that of the first liquid; maintaining said material out of contact with said first liquid following the expulsion of the latter from said material; and separating said first and second liquids in liquid form.

2. The process according to claim 1 wherein said first liquid is applied only in the quantity necessary to dissolve the impurities.

3. The process according to claim 1 wherein one of said liquids is water and the other is an organic solvent.

4. The process according to claim 3 wherein water is used to dissolve water soluble impurities.

5. The process according to claim 3 wherein organic solvent is used to dissolve water insoluble impurities.

6. The process according to claim 1 wherein said second liquid is sprayed onto said material under sufficient force as to expell said first liquid from said material.

7. The process according to claim 6 wherein one of said liquids is water and the other liquid is an organic solvent, and wherein said liquids are separated by distillation.

8. The process according to claim 1 wherein said first liquid is water and wherein said second liquid is a bath of organic solvent into which water-containing material is led, said solvent having a greater specific gravity than that of the water.

9. The process according to claim 1 wherein said first liquid is an organic solvent and wherein the solvent-containing material is led into a bath of water having a specific gravity less than that of said solvent.

10. The process according to claim 1 including heating at least one of said liquids.

11. The process according to claim 1 wherein said material contains water soluble impurities, and wherein said first liquid is water in an amount between 50 to 250 percent the weight of said material.

12. The process according to claim 1 wherein a time delay of several minutes occurs between the application of said first liquid and the application of said second liquid.

13. The process according to claim 1 wherein at least a portion of said first liquid is squeezed from said material mechanically prior to the application of said second liquid.

14. The process according to claim 1 wherein a detergent is added to one of said liquids.

15. The process according to claim 1 wherein said material comprises synthetic fibres of the class including polyesters, polyamides, polyacrylnitriles, acetates, and mixtures thereof.

16. The process according to claim 1 wherein said liquids are separated mechanically by gravity.

17. A process of removing water soluble impurities from textile material comprising first applying to said material water in an amount between 50%–250% of the weight of said material; subsequently expelling said water and impurities dissolved therein from said material by applying to said material an organic solvent immiscible with water and having a specific gravity greater than that of water; and separating said water and organic solvent in liquid form.

* * * * *